Feb. 24, 1970 R. W. DANIELS 3,497,836

NONRECIPROCAL TRANSISTOR NETWORK

Filed Oct. 15, 1968 2 Sheets-Sheet 1

INVENTOR
R. W. DANIELS
BY Leonard D. Arnold
ATTORNEY 3,497,836

NONRECIPROCAL TRANSISTOR NETWORK

Richard W. Daniels, Andover, Mass., assignor to Bell Telephone Laboratories, Incorporated, Murray Hill, N.J., a corporation of New York Filed Oct. 15, 1968, Ser. No. 767,659
Int. Cl. H01p 1/32
U.S. Cl. 333—80 6 Claims

ABSTRACT OF THE DISCLOSURE

A two-port gyrator network is disclosed having three transistors and two resistors. Gyrator action is obtained between one port which has connections to the emitter of a first transistor and the collector of a third transistor and another port which has connections to the emitter of a second transistor and to the base electrodes of the first and third transistors. One resistor joins a collector-base connection of the first and second transistors to the emitter of the third transistor, while the other resistor joins the collector of the third transistor to the bases of the first and third transistors. The circuit arrangements disclosed more completely in the specification may be biased for integrated networks without the use of complementary transistors.

BACKGROUND OF THE INVENTION

This invention relates generally to nonreciprocal electric networks and more particularly to transistor gyrator circuits.

Broadly speaking, network synthesis may be defined as "the methods by which an electric network can be formed to realize a prescribed characteristic." (K. L. Su, "Active Network Synthesis," p. 1, McGraw-Hill, Inc., 1965.) In the past, network synthesis was based on the existence of simple circuit elements, such as resistors, capacitors, inductors and transformers. But, with the advent of modern synthesis techniques many new elements having specialized electrical characteristics were developed. Some of these, such as the negative resistance, the nullator, norator, circulator and gyrator are described simply by Su at pp. 8–39 in the above-mentioned article.

Often new elements for electric networks are defined theoretically and mathematically before a realizable physical representation is found. The gyrator, for one, was first described theoretically as early as 1948 by B. Tellegen in "The Gyrator, A New Electric Network Element," Philips Research Reports, vol. 3, No. 2, pp. 81–101 (1948).

Since that time a number of patents have issued disclosing various transistor circuits which approximated the characteristics of the theoretical gyrator. The present invention is an alternative transistor network which may be used to realize the characteristic of the theoretical gyrator. As will be appreciated from the discussion below, the gyrator forming the subject of the present invention is particularly well suited to known integrated circuit techniques and thereby offers the designer greater latitude in using such circuits in practical networks.

The gyrator is a four-terminal, two-part network which may be defined by the following pair of equations:

$$V_1=-I_2R_1 \quad (1)$$

$$V_2=I_1R_2 \quad (2)$$

where $I_1$ is the current into and $V_1$ is the voltage across the two terminals constituting one port, and $I_2$ is the current into and $V_2$ is the voltage across the two terminals constituting the second port. As may be noted from Equations 1 and 2, the gyrator associates its name with the fact that it gyrates an input voltage into an output current and vice versa. $R_1$ and $R_2$ are transfer impedances whose product determines the gyration constant K. In an ideal passive gyrator circuit as defined by Tellegen in the above cited article the transfer impedances, $R_1$ and $R_2$, are equal, but in general they may be unequal.

The gyrator is important in network synthesis because it is one of the simplest and most basic nonreciprocal networks from which other nonreciprocal networks such as the circulator can be formed. In simple terms, a network is reciprocal when a voltage source inserted in one part of the network produces a current at some other part of the network such that the ratio of the applied voltage to the measured current, called the transfer impedance, will be the same if the relative positions of the driving source and the measured effect are reversed. Electrical networks which contain only resistors, capacitors, inductors and transformers generally are reciprocal networks. The gyrator, however, is always nonreciprocal since the transfer impedance for one direction of propagation always differs in sign from that for propagation in the reverse direction, as demonstrated by the different signs in Equations 1 and 2 above. A gyrator may be further nonreciprocal in that the magnitude of the transfer impedances, $R_1$ and $R_2$, in Equations 1 and 2 may in general be unequal.

In practical application the gyrator is important as a positive impedance inverter. That is, if an impedance +Z is connected between one pair of terminals, the impedance measured at the other terminals is proportional to $$+\frac{1}{Z}$$

Thus, for example, if the gyrator network defined by Equations 1 and 2 is terminated with an output impedance $Z_{out}$, the input impedance will be defined by Equation 3:

$$Z_{in}=\frac{R_1R_2}{Z_{out}}=\frac{K}{Z_{out}} \quad (3)$$

where K is again the gyration constant. As a result, a capacitor with an impedance $1/j\omega C$ can be made to appear as an inductor with an impedance $j\omega KC$.

The ability to substitute a capacitor for an inductor is significant in the integrated circuit art because the inductor has been especially difficult to realize with known integrated techniques. In practical terms, this means that with integrated circuits it may be easier and less expensive to produce a capacitor and a gyrator circuit consisting of a plurality of resistors and transistors than to produce the simple elemental inductor.

It is, therefore, the object of the present invention to provide a transistor gyrator network which is suited to known integrated circuit techniques.

SUMMARY OF THE INVENTION

The present invention is a gyrator network which comprises a plurality of transistors each having emitter, collector and base electrodes. In accordance with the invention the collector of a first transistor is connected directly to the base of a second transistor and through a resistor to the emitter of the third transistor, while the base of the first transistor is connected directly to the base of the third transistor and through a resistor to the collector of the third transistor. The collector of the second transistor is connected in one embodiment of the invention directly to the emitter of the third transistor and in an alternative embodiment of the invention directly to the collector of the third transistor. Both embodiments may be biased for integrated networks without the use of complementary transistors. Gyrator action is obtained with an input port connected between the emitter of the first transistor and the collector of the third transistor and an output port connected between the emitter of the second transistor and the base electrodes of the first and third transistors.

BRIEF DESCRIPTION OF THE DRAWINGS

This invention will be more fully comprehended from the following detailed description taken in conjunction with the drawings, in which.

DETAILED DESCRIPTION

Figure 1:
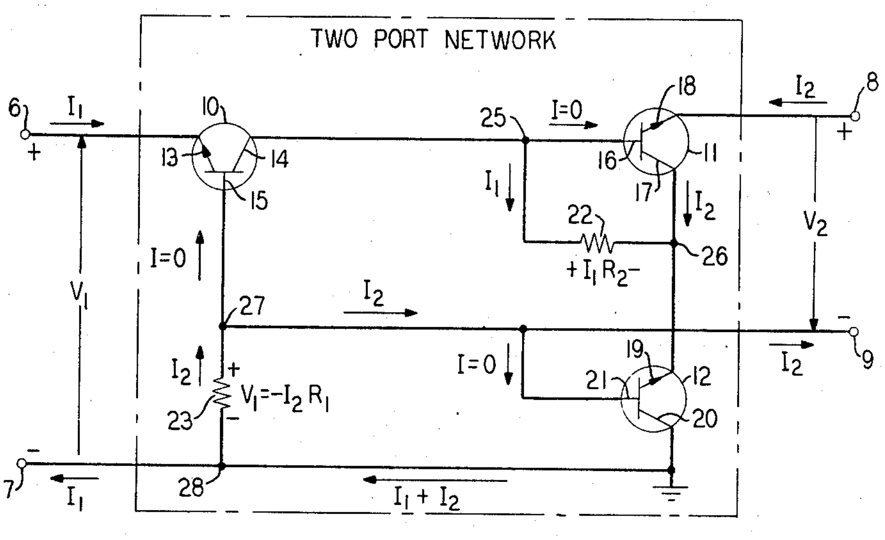
FIG. 1 is a schematic diagram of a gyrator circuit embodying this invention.

FIG. 1 shows a gyrator circuit embodying the present invention. The only active elements are transistors 10, 11 and 12, each having emitter, collector and base electrodes. Emitter 13 of transistor 10 and collector 20 of transistor 12 are connected directly to input terminals 6 and 7, respectively. Emitter 18 of transistor 11 is connected directly to output terminal 8, and bases 15 and 21 of transistors 10 and 12 are connected directly to output terminal 9. Collector 14 of transistor 10 is connected to base 16 of transistor 11, and collector 17 of transistor 11 is connected to emitter 19 of transistor 12. Collector 14 of transistor 10 is also connected through resistor 22, having a resistance $R_2$, to emitter 19 of transistor 12, and bases 15 and 21 of transistors 10 and 12 are also connected through resistor 23, having a resistance $R_1$, to collector 20 of transistor 12.

That the circuit shown in FIG. 1 satisfies Equations 1 and 2 above may be shown by the following analysis:

Assume ideal transistors are used; i.e., that the base current $I_b=0$, that the voltage between the base and emitter electrodes $V_{be}=0$ and that the emitter current $I_e$ is equal to the collector current $I_c$. By convention, the direction of the arrows on the emitter electrodes of transistors 10, 11 and 12 are defined to be in the direction in which direct current will flow through these electrodes. However, once the transistor is properly biased in its operating range, current may be assumed to flow in either direction from the emitter to the collector, with the only constraint being that $I_e=I_c$, as defined above, for the ideal transistor.

The gyrator circuit shown in FIG. 1 is a two-port network with a pair of input and output terminals. Input voltage $V_1$ is supplied across input terminals 6 and 7 and output voltage $V_2$ is measured across output terminals 8 and 9 as shown. In accordance with the convention adopted in FIG. 1, current $I_1$ is assumed to flow into the network at input terminal 6 and out of the network at input terminal 7; and current $I_2$ is assumed to flow into the network at output terminal 8 and out of the network at output terminal 9. Since $I_c=I_e$, all of current $I_1$ at input terminal 6 flows through transistor 10 and appears at junction 25. Since $I_b=0$ for transistor 11, all of current $I_1$ must flow through resistor 22 with resistance $R_2$, causing a voltage drop $I_1R_2$ as shown between junctions 25 and 26. But since the voltage $V_{be}$ for transistors 11 and 12 is equal to zero, output terminal 8 may be traced through transistor 11 to junction 25, and output terminal 9 may be traced through transistor 12 to junction 26 so that $V_2$ is equal to the voltage drop across resistor 22. Thus $V_2=I_1R_2$ and Equation 2 is satisfied.

Similarly, since $V_{be}$ for transistor 10 is equal to zero, input voltage $V_1$ appears across resistor 23, with resistance $R_1$, between junctions 27 and 28; and since $I_b$ for transistors 10 and 12 is equal to zero, the current between junctions 27 and 28 must be equal to $I_2$ to supply the current $I_2$ at output terminal 9 as shown in FIG. 1. Thus, the voltage drop across resistor 23 is equal to $I_2R_1$ in the direction as shown. Because voltage $V_1$ appears across resistor 23 in the opposite direction, $V_1=-I_2R_1$ and Equation 1 is satisfied. Thus, the circuit shown in FIG. 1 functions as a gyrator.

Figure 2:
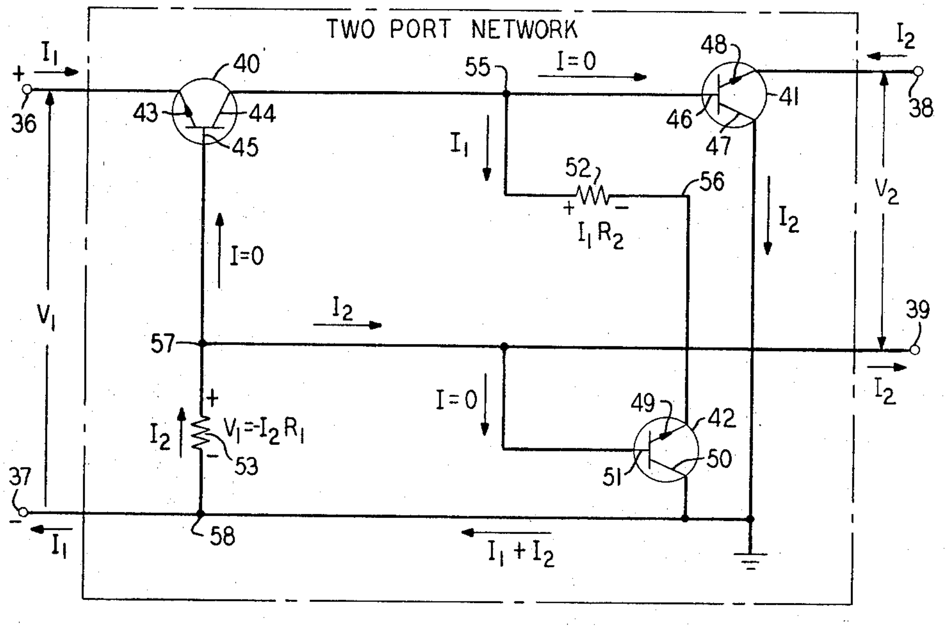
FIG. 2 is a schematic diagram of an alternative gyrator circuit embodying this invention.

The circuit shown in FIG. 2 is an alternative gyrator circuit embodying the principles of the invention. Input voltage $V_1$ is supplied across input terminals 36 and 37 and output voltage $V_2$ is measured across output terminals 38 and 39 in the identical manner as shown for the circuit configuration in FIG. 1. In accordance with the same convention adopted in FIG. 1, current $I_1$ is assumed to flow into the network at input terminal 36 and out of the network at input terminal 37; and current $I_2$ is assumed to flow into the network at output terminal 38 and out of the network at output terminal 39.

Transistors 40, 41, and 42 shown in FIG. 2 correspond respectively to transistors 10, 11, and 12 in the circuit configuration shown in FIG. 1. Emitter 43 of transistor 40 and collector 50 of transistor 42 are connected directly to input terminals 36 and 37, respectively. Emitter 48 of transistor 41 is connected directly to output terminal 38 and bases 45 and 51 of transistors 40 and 42 are connected directly to output terminal 39 in a manner similar to that shown for transistors 10, 11, and 12 shown in FIG. 1. Also, as in FIG. 1, collector 44 of transistor 40 is connected through resistor 52, having a resistance $R_2$, to emitter 49 of transistor 42, while bases 45 and 51 of transistors 40 and 42 are connected through resistor 53, having a resistance $R_1$, to collector 50 of transistor 42. Collector 44 of transistor 40 is also connected to base 46 of transistor 41. The circuit in FIG. 2 differs from the configuration in FIG. 1 only in that collector 47 of transistor 41 is connected directly to collector 50 of transistor 42 instead of emitter 49 of transistor 42.

The following analysis demonstrates that the circuit shown in FIG. 2 satisfies Equations 1 and 2 and thereby produces gyrator action in accordance with the principles of the invention. Assume again that ideal transistors are used. Thus, since $I_c=I_e$, all of current $I_1$ at input terminal 36 flows through transistor 40 and appears at junction 55. Since $I_b=0$ for transistor 41 all of current $I_1$ must flow through resistor 52 with resistance $R_2$ causing voltage drop $I_1R_2$ between junction 55 and point 56 as shown. But since voltage $V_{be}$ for transistors 41 and 42 is equal to zero, output terminal 38 may be traced through transistor 41 to junction 55 and output terminal 39 may be traced through transistor 42 to point 56 so that $V_2$ is equal to the voltage drop across resistor 52. Thus, $V_2=I_1R_2$ and Equation 2 is satisfied in the same manner as the embodiment of the invention shown in FIG. 1.

Similarly, since $V_{be}$ for transistor 40 is equal to zero, input voltage $V_1$ appears across resistor 53, between junctions 57 and 58; and since $I_b$ for transistors 40 and 42 is equal to zero, the current between junctions 57 and 58 must be equal to $I_2$ to supply a current $I_2$ at output terminal 39. Thus, the voltage drop across resistor 53, with resistance $R_1$, is equal to $I_2R_1$ in the direction as shown. Because voltage $V_1$ appears across resistor 53 in the opposite direction, $V_1=-I_2R_1$ and Equation 1 is also satisfied. The embodiment of the invention shown in FIG. 2, therefore, produces gyrator action by responding to the applied voltage and current in the same manner as the embodiment shown in FIG. 1.

In the alternative embodiments of the invention shown in FIGS. 1 and 2, terminals 6, 7, 36, and 37 are considered to be the input terminals, and terminals 8, 9, 38, and 39 are considered to be the output terminals. It is to be understood, however, that gyrator action may also be obtained if the input is applied at terminals 8 and 9 or 38 and 39 and the output taken at terminals 6 and 7 or 36 and 37.

Figure 3:
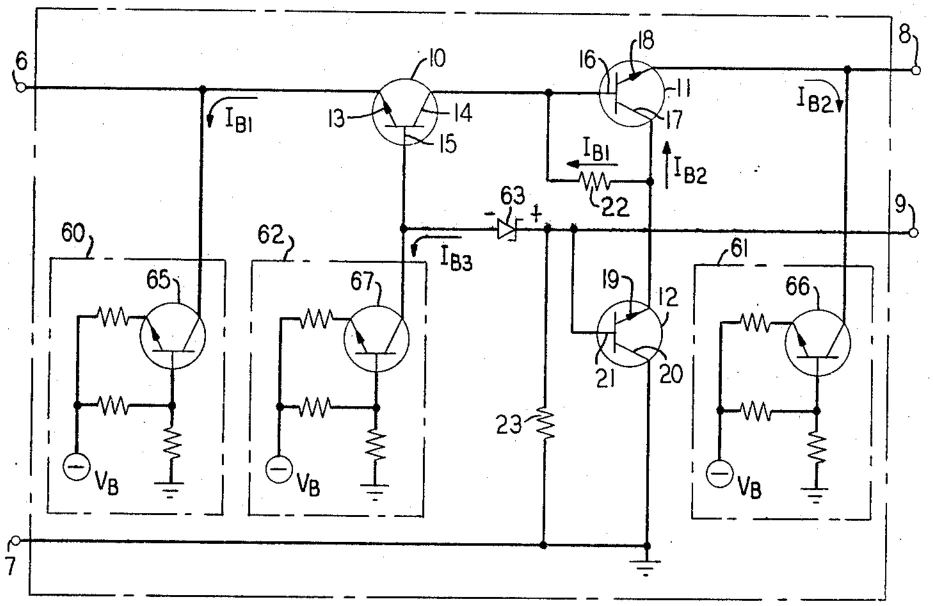
FIG. 3 is a diagram showing the circuit of FIG. 1 accompanied by a schematic drawing of a biasing circuit.

FIG. 3 shows a direct coupled biasing circuit which may be used with the embodiment of the invention shown in FIG. 1. The schematic circuit diagram of FIG. 3 is identical to that for FIG. 1 except that bias sources 60, 61 and 62 and Zener diode 63 are added, as shown. The function of each of the biasing elements 60, 61, 62 and 63 is to maintain transistors 10, 11 and 12 in their operating ranges. A transistor is properly biased when the bias current flows in the direction of the arrow on the emitter electrode. In the case of NPN transistors this means that the voltage $V_{be}$, of the base with respect to the emitter, and the voltage $V_{ce}$, of the collector with respect to the emitter, are positive.

Transistor 65 in bias source 60 draws a bias current $I_{B1}$ through transistor 10 in the direction of the arrow shown on emitter electrode 13 so that transistor 10 is biased in its operating range. Similarly, transistor 66 in bias source 61 draws a bias current $I_{B2}$ through transistor 11 in the direction of the arrow on emitter electrode 18. Transistors 67 in bias source 62 draws a current $I_{B3}$ through Zener diode 63, causing a voltage across Zener diode 63 in the direction as shown. This condition insures that $V_{be}$ and $V_{ce}$ of transistor 12 will be positive so that the bias current for transistor 12 will flow in the direction of the arrow on emitter electrode 19. It may be noted, of course, that the resistor in bias sources 60, 61, and 62 may be varied to adjust the bias currents for transistors 10, 11, and 12 for optimum operation.

Figure 4:
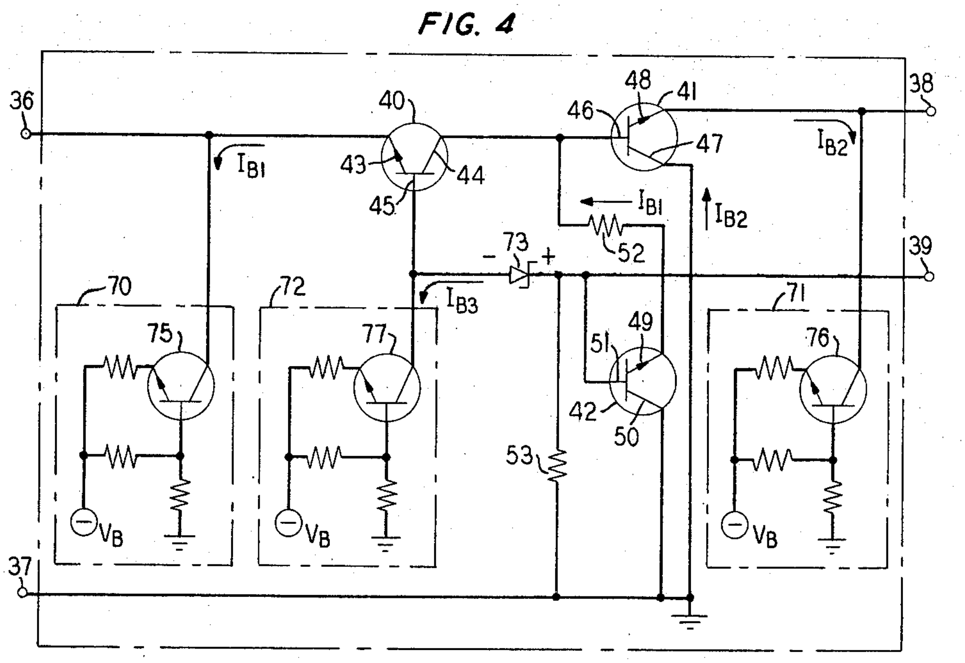
FIG. 4 is a diagram showing the circuit of FIG. 2 accompanied by a schematic drawing of a biasing circuit.

FIG. 4 shows a direct coupled biasing circuit which may be used with the embodiment of the invention shown in FIG. 2. Except for the addition of bias sources 70, 71, and 72 and Zener diode 73, as shown, the circuit in FIG. 4 is identical to the circuit in FIG. 2. The function of the biasing elements 70, 71, 72, and 73 is to maintain transistors 40, 41, and 42 in their operating ranges in the same manner as transistors 10, 11, and 12 shown in FIG. 3.

Transistor 75 in bias source 70 draws a bias current $I_{B1}$, through transistor 40 in the direction of the arrow shown on emitter electrode 43 to bias transistor 40 in its operating range. In the same manner as shown in FIG. 3 bias source 71 similarly draws a bias current $I_{B2}$ through transistor 41 in the direction of the arrow shown on emitter 48 in FIG. 4. Likewise, transistor 77 in bias source 72 draws a current $I_{B3}$ through Zener diode 73, causing a voltage drop across Zener diode 73 in the direction as shown, to maintain the voltage on the base and collector electrodes of transistor 42 at positive values relative to the emitter electrode so that transistor 42 will be properly biased.

The significance of the biasing arrangement shown in FIGS. 3 and 4 is that the transistors of the gyrator are biased with transistorized current sources without the use of complementary transistors. Biasing with transistorized current sources, such as illustrated by sources 60, 61, and 62 in FIG. 3 and sources 70, 71, and 72 in FIG. 4, obviates the need for high impedance biasing resistors which are nonintegratable. But, with existing techniques it is difficult to produce an integrated circuit with more than one type of transistor in any given integrated unit. Thus, the ability to use this type of biasing arrangement, without the use of complementary transistors, avoids a troublesome production problem. It may be noted, in addition, that all transistors shown in FIGS. 3 and 4 are NPN, but the same circuits may be made to operate equally well with PNP transistors by techniques well known in the art.

Thus, in accordance with this invention a new transistor gyrator network is made available to the integrated circuit designer, providing him with greater latitude in design than heretofore available.

It is to be understood that the above-described arrangements are merely illustrative of applications of the principles of the invention. Numerous other arrangements may be devised by those skilled in the art without departing from the spirit and scope of the invention.

What is claimed is:

1. A gyrator network having an input port with first and second input terminals and an output port with first and second output terminals comprising in combination:

a plurality of transistors each having emitter, collector and base electrodes, one of said input terminals connected directly to the emitter of a first of said transistors and the other of said input terminals connected directly to a collector of a third of said transistors, one of said output terminals connected directly to the emitter of a second of said transistors and the other of said output terminals connected directly to the base electrodes of said first and third transistors;

means connecting the collector of said first transistor to the base of said second transistor;

means, including impedance means, connecting the collector of said first transistor to the emitter of said third transistor;

means, including impedance means, connecting the base electrodes of said first and third transistors to the collector of said third transistor; and means connecting the collector of said second transistor to one electrode of said third transistor for producing gyrator action between said input and output ports of said network.

2. A gyrator network having first and second input terminals and first and second output terminals, an input voltage $+V_1$ being supplied at said first input terminal with respect to said second input terminal and an input current $I_1$ being supplied into said network at said first input terminal and out of said network at said second input terminal, an output voltage $+V_2$ being measured at said first output terminal with respect to said second output terminal and an output current $I_2$ being measured into said network at said first output terminal and out of said network at said second output terminal comprising in combination:

a first transistor having emitter, collector and base electrodes, said emitter connected to receive said current $I_1$ at said first input terminal and transmit said current to said collector electrode;

a second transistor having emitter, collector and base electrodes, said base of said second transistor connected to receive said current $I_1$ from said collector of said first transistor;

a first impedance means having a resistance $R_2$ connected to said base of said second transistor so that substantially all of said current $I_1$ from said first transistor flows through said resistor;

a third transistor having emitter, collector and base electrodes, said emitter connected to said first impedance means to receive said current $I_1$ from said first resistor, and said collector connected to receive said current $I_1$ from said emitter;

means for transmitting said current $I_1$ from the collector of said third transistor to said second input terminal;

means connecting said first output terminal directly to the emitter of said second transistor;

means connecting said second output terminal to the bases of said first and third transistors such that the following voltage and current relationship is satisfied between said input and output terminals:

$$V_2 = I_1 R_2$$

a second impedence means having a resistance $R_1$ connected between said second output terminal and said collector of said third transistor such that said current $I_2$ flows through said second impedance means to said second output terminal and means connecting the collector of said second transistor to said third transistor such that the following voltage and current relationship is satisfied:

$$V_1 = -I_2R_1$$

whereby gyrator action is produced between said input and output terminals.

3. Apparatus in accordance with claim 2 wherein the collector of said second transistor is connected directly to the emitter of said third transistor and said first impedance means to satisfy said voltage and current relationship and produce gyrator action between said input and output terminals.

4. Apparatus in accordance with claim 2 wherein the collector of said second transistor is connected directly to the collector of said third transistor and said second impedance means to satisfy said voltage and current relationships and produce gyrator action between said input and output terminals.

5. A gyrator network comprising in combination:

first, second, and third transistors each having emitter, collector and base electrodes, the collector of said first transistor connected to the base of said second transistor, the base of said first transistor connected to the base of said third transistor, the collector of said second transistor connected to the emitter of the third transistor;

a first resistor connecting the base of said second transistor and the collector of said first transistor to the collector of said second transistor and the emitter of said third transistor;

a second resistor connecting the collector of said third transistor to the base electrodes of said first and third transistors;

an input port having a pair of input terminals, one of said input terminals connected directly to the emitter of said first transistor and the other of said input terminals connected directly to the collector of said third transistor;

and an output port having a pair of output terminals, one of said output terminals connected directly to the emitter of said second transistor and the other of said output terminals connected directly to the base electrodes of said first and third transistors.

6. A gyrator network comprising in combination:

first, second, and third transistors each having emitter, collector and base electrodes, the collector of said first transistor connected to the base of said second transistor, the base of said first transistor connected to the base of said third transistor, the collector of said second transistor connected to the collector of said third transistor;

a first resistor connecting the base of said second transistor and the collector of said first transistor to the emitter of said third transistor;

a second resistor connecting the collector electrodes of said second and third transistors to the base electrodes of said first and third transistors;

an input port having a pair of input terminals, one of said input terminals connected directly to the emitter of said first transistor and the other of said input terminals connected directly to the collector of said third transistor;

and an output port having a pair of terminals, one of said output terminals connected directly to the emitter of said second transistor and the other of said output terminals connected directly to the base electrodes of said first and third transistors.

References Cited

Mitra: Alternate Realizations of Four-Terminal and Three-Terminal Negative-Impedance Inverters, Proc. of IEEE, March 1968.

HERMAN KARL SAALBACH, Primary Examiner

PAUL L. GENSLER, Assistant Examiner

U.S. Cl. X.R.

307—295, 322